(12) United States Patent
Toyoyama et al.

(10) Patent No.: US 6,775,684 B1
(45) Date of Patent: Aug. 10, 2004

(54) DIGITAL MATCHED FILTER

(75) Inventors: Shinji Toyoyama, Sakurai (JP); Yuichi Sato, Naga-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 512 days.

(21) Appl. No.: 09/586,596

(22) Filed: Jun. 2, 2000

(30) Foreign Application Priority Data

Jun. 3, 1999 (JP) ........................................ H11-156112

(51) Int. Cl.[7] .......................................... G06F 17/10
(52) U.S. Cl. ................................... 708/314; 708/300
(58) Field of Search ............................. 708/300–323; 370/206, 441; 375/308, 232, 295, 152

(56) References Cited

U.S. PATENT DOCUMENTS

| | | | | | |
|---|---|---|---|---|---|
| 4,080,660 | A | * | 3/1978 | Constant ..................... | 708/420 |
| 4,866,648 | A | * | 9/1989 | Usui ........................... | 708/300 |
| 5,140,613 | A | * | 8/1992 | Birgenheier et al. ........ | 375/308 |
| 5,237,586 | A | * | 8/1993 | Bottomley ................... | 370/206 |
| 5,586,068 | A | * | 12/1996 | Rakib .......................... | 708/319 |
| 5,757,766 | A | * | 5/1998 | Sugita ......................... | 370/206 |
| 5,793,806 | A | * | 8/1998 | Maeda et al. ................ | 375/232 |
| 6,128,309 | A | * | 10/2000 | Tariki .......................... | 370/441 |
| 6,181,733 | B1 | * | 1/2001 | Shinde ........................ | 375/152 |
| 6,366,938 | B1 | * | 4/2002 | Levison et al. ............. | 708/422 |
| 6,519,292 | B1 | * | 2/2003 | Sakoda et al. .............. | 375/295 |

FOREIGN PATENT DOCUMENTS

JP             A10173485        6/1998

* cited by examiner

*Primary Examiner*—Kakali Chaki
*Assistant Examiner*—Chat C. Do
(74) *Attorney, Agent, or Firm*—Birch, Stewart, Kolasch & Birch, LLP.

(57) ABSTRACT

A digital matched filter has a serial-to-parallel conversion circuit that converts input data fed thereto in serial form into n sets of parallel data and a plurality of delay circuits that each output serial data fed thereto with a delay corresponding to n sets of data. The serial-to-parallel conversion circuit and the delay circuits are each fed with n clocks having different phases, and are composed of delay devices connected in n groups of serially connected delay devices so that the input data is shifted in synchronism with the rising edges of those n clocks. The outputs from the individual delay devices are multiplied by codes by multipliers, and the results of those multiplications are added together and output as output data by an adder.

22 Claims, 12 Drawing Sheets

| TIME | OUTPUT OF DELAY DEVICE1 | OUTPUT OF DELAY DEVICE2 | OUTPUT OF DELAY DEVICE3 | OUTPUT OF DELAY DEVICE4 | OUTPUT OF DELAY DEVICE5 | OUTPUT OF DELAY DEVICE6 | OUTPUT OF DELAY DEVICE7 | OUTPUT OF DELAY DEVICE8 | CODE1 | CODE2 | CODE3 | CODE4 | CODE5 | CODE6 | CODE7 | CODE8 |
|---|---|---|---|---|---|---|---|---|---|---|---|---|---|---|---|---|
| T1  | D1  |     |     |     |     |     |     |     | S1 | S4 | S3 | S2 | S5 | S8 | S7 | S6 |
| T2  | D1  | D2  |     |     |     |     |     |     | S2 | S1 | S4 | S3 | S6 | S5 | S8 | S7 |
| T3  | D1  | D2  | D3  |     |     |     |     |     | S3 | S2 | S1 | S4 | S7 | S6 | S5 | S8 |
| T4  | D1  | D2  | D3  | D4  |     |     |     |     | S4 | S3 | S2 | S1 | S8 | S7 | S6 | S5 |
| T5  | D5  | D2  | D3  | D4  | D1  |     |     |     | S1 | S4 | S3 | S2 | S5 | S8 | S7 | S6 |
| T6  | D5  | D6  | D3  | D4  | D1  | D2  |     |     | S2 | S1 | S4 | S3 | S6 | S5 | S8 | S7 |
| T7  | D5  | D6  | D7  | D4  | D1  | D2  | D3  |     | S3 | S2 | S1 | S4 | S7 | S6 | S5 | S8 |
| T8  | D5  | D6  | D7  | D8  | D1  | D2  | D3  | D4  | S4 | S3 | S2 | S1 | S8 | S7 | S6 | S5 |
| T9  | D9  | D6  | D7  | D8  | D5  | D2  | D3  | D4  | S1 | S4 | S3 | S2 | S5 | S8 | S7 | S6 |
| T10 | D9  | D10 | D7  | D8  | D5  | D6  | D3  | D4  | S2 | S1 | S4 | S3 | S6 | S5 | S8 | S7 |
| T11 | D9  | D10 | D11 | D8  | D5  | D6  | D7  | D4  | S3 | S2 | S1 | S4 | S7 | S6 | S5 | S8 |
| T12 | D9  | D10 | D11 | D12 | D5  | D6  | D7  | D8  | S4 | S3 | S2 | S1 | S8 | S7 | S6 | S5 |
| T13 | D13 | D10 | D11 | D12 | D9  | D6  | D7  | D8  | S1 | S4 | S3 | S2 | S5 | S8 | S7 | S6 |
| T14 | D13 | D14 | D11 | D12 | D9  | D10 | D7  | D8  | S2 | S1 | S4 | S3 | S6 | S5 | S8 | S7 |
| T15 | D13 | D14 | D15 | D12 | D9  | D10 | D11 | D8  | S3 | S2 | S1 | S4 | S7 | S6 | S5 | S8 |
| T16 | D13 | D14 | D15 | D16 | D9  | D10 | D11 | D12 | S4 | S3 | S2 | S1 | S8 | S7 | S6 | S5 |
| T17 | D17 | D14 | D15 | D16 | D13 | D10 | D11 | D12 | S1 | S4 | S3 | S2 | S5 | S8 | S7 | S6 |

| TIME | OUTPUT OF DELAY DEVICE 1 | OUTPUT OF DELAY DEVICE 2 | OUTPUT OF DELAY DEVICE 3 | OUTPUT OF DELAY DEVICE 4 | OUTPUT OF DELAY DEVICE 5 | OUTPUT OF DELAY DEVICE 6 | OUTPUT OF DELAY DEVICE 7 | OUTPUT OF DELAY DEVICE 8 | CODE1 | CODE2 | CODE3 | CODE4 | CODE5 | CODE6 | CODE7 | CODE8 |
|---|---|---|---|---|---|---|---|---|---|---|---|---|---|---|---|---|
| T1  | D1  |     |     |     |     |     |     |     | S1 | S8 | S7 | S6 | S5 | S4 | S3 | S2 |
| T2  | D1  | D2  |     |     |     |     |     |     | S2 | S1 | S8 | S7 | S6 | S5 | S4 | S3 |
| T3  | D1  | D2  | D3  |     |     |     |     |     | S3 | S2 | S1 | S8 | S7 | S6 | S5 | S4 |
| T4  | D1  | D2  | D3  | D4  |     |     |     |     | S4 | S3 | S2 | S1 | S8 | S7 | S6 | S5 |
| T5  | D5  |     |     |     | D1  | D2  | D3  | D4  | S1 | S8 | S7 | S6 | S5 | S4 | S3 | S2 |
| T6  | D5  | D6  |     |     | D1  | D2  | D3  | D4  | S2 | S1 | S8 | S7 | S6 | S5 | S4 | S3 |
| T7  | D5  | D6  | D7  |     | D1  | D2  | D3  | D4  | S3 | S2 | S1 | S8 | S7 | S6 | S5 | S4 |
| T8  | D5  | D6  | D7  | D8  | D1  | D2  | D3  | D4  | S4 | S3 | S2 | S1 | S8 | S7 | S6 | S5 |
| T9  | D9  | D2  | D3  | D4  | D5  | D6  | D7  | D8  | S1 | S8 | S7 | S6 | S5 | S4 | S3 | S2 |
| T10 | D9  | D10 | D3  | D4  | D5  | D6  | D7  | D8  | S2 | S1 | S8 | S7 | S6 | S5 | S4 | S3 |
| T11 | D9  | D10 | D11 | D4  | D5  | D6  | D7  | D8  | S3 | S2 | S1 | S8 | S7 | S6 | S5 | S4 |
| T12 | D9  | D10 | D11 | D12 | D5  | D6  | D7  | D8  | S4 | S3 | S2 | S1 | S8 | S7 | S6 | S5 |
| T13 | D13 | D6  | D7  | D8  | D9  | D10 | D11 | D12 | S1 | S8 | S7 | S6 | S5 | S4 | S3 | S2 |
| T14 | D13 | D14 | D7  | D8  | D9  | D10 | D11 | D12 | S2 | S1 | S8 | S7 | S6 | S5 | S4 | S3 |
| T15 | D13 | D14 | D15 | D8  | D9  | D10 | D11 | D12 | S3 | S2 | S1 | S8 | S7 | S6 | S5 | S4 |
| T16 | D13 | D14 | D15 | D16 | D9  | D10 | D11 | D12 | S4 | S3 | S2 | S1 | S8 | S7 | S6 | S5 |
| T17 | D17 | D10 | D11 | D12 | D13 | D14 | D15 | D16 | S1 | S8 | S7 | S6 | S5 | S4 | S3 | S2 |

| TIME | OUTPUT OF DELAY DEVICE1 | OUTPUT OF DELAY DEVICE2 | OUTPUT OF DELAY DEVICE3 | OUTPUT OF DELAY DEVICE4 | OUTPUT OF DELAY DEVICE5 | OUTPUT OF DELAY DEVICE6 | OUTPUT OF DELAY DEVICE7 | OUTPUT OF DELAY DEVICE8 | CODE1 | CODE2 | CODE3 | CODE4 | CODE5 | CODE6 | CODE7 | CODE8 |
|---|---|---|---|---|---|---|---|---|---|---|---|---|---|---|---|---|
| T1 | D1 | | | | | | | | S1 | S2 | S3 | S4 | S5 | S6 | S7 | S8 |
| T2 | D2 | D1 | | | | | | | S1 | S2 | S3 | S4 | S5 | S6 | S7 | S8 |
| T3 | D3 | D2 | D1 | | | | | | S1 | S2 | S3 | S4 | S5 | S6 | S7 | S8 |
| T4 | D4 | D3 | D2 | D1 | | | | | S1 | S2 | S3 | S4 | S5 | S6 | S7 | S8 |
| T5 | D5 | D4 | D3 | D2 | D1 | | | | S1 | S2 | S3 | S4 | S5 | S6 | S7 | S8 |
| T6 | D6 | D5 | D4 | D3 | D2 | D1 | | | S1 | S2 | S3 | S4 | S5 | S6 | S7 | S8 |
| T7 | D7 | D6 | D5 | D4 | D3 | D2 | D1 | | S1 | S2 | S3 | S4 | S5 | S6 | S7 | S8 |
| T8 | D8 | D7 | D6 | D5 | D4 | D3 | D2 | D1 | S1 | S2 | S3 | S4 | S5 | S6 | S7 | S8 |
| T9 | D9 | D8 | D7 | D6 | D5 | D4 | D3 | D2 | S1 | S2 | S3 | S4 | S5 | S6 | S7 | S8 |
| T10 | D10 | D9 | D8 | D7 | D6 | D5 | D4 | D3 | S1 | S2 | S3 | S4 | S5 | S6 | S7 | S8 |
| T11 | D11 | D10 | D9 | D8 | D7 | D6 | D5 | D4 | S1 | S2 | S3 | S4 | S5 | S6 | S7 | S8 |
| T12 | D12 | D11 | D10 | D9 | D8 | D7 | D6 | D5 | S1 | S2 | S3 | S4 | S5 | S6 | S7 | S8 |
| T13 | D13 | D12 | D11 | D10 | D9 | D8 | D7 | D6 | S1 | S2 | S3 | S4 | S5 | S6 | S7 | S8 |
| T14 | D14 | D13 | D12 | D11 | D10 | D9 | D8 | D7 | S1 | S2 | S3 | S4 | S5 | S6 | S7 | S8 |
| T15 | D15 | D14 | D13 | D12 | D11 | D10 | D9 | D8 | S1 | S2 | S3 | S4 | S5 | S6 | S7 | S8 |
| T16 | D16 | D15 | D14 | D13 | D12 | D11 | D10 | D9 | S1 | S2 | S3 | S4 | S5 | S6 | S7 | S8 |
| T17 | D17 | D16 | D15 | D14 | D13 | D12 | D11 | D10 | S1 | S2 | S3 | S4 | S5 | S6 | S7 | S8 |

| TIME | OUTPUT OF DELAY DEVICE1 | OUTPUT OF DELAY DEVICE2 | OUTPUT OF DELAY DEVICE3 | OUTPUT OF DELAY DEVICE4 | OUTPUT OF DELAY DEVICE5 | OUTPUT OF DELAY DEVICE6 | OUTPUT OF DELAY DEVICE7 | OUTPUT OF DELAY DEVICE8 | CODE1 | CODE2 | CODE3 | CODE4 | CODE5 | CODE6 | CODE7 | CODE8 |
|---|---|---|---|---|---|---|---|---|---|---|---|---|---|---|---|---|
| T1  | D1  |     |     |     |     |     |     |     | S1 | S8 | S7 | S6 | S5 | S4 | S3 | S2 |
| T2  | D1  | D2  |     |     |     |     |     |     | S2 | S1 | S8 | S7 | S6 | S5 | S4 | S3 |
| T3  | D1  | D2  | D3  |     |     |     |     |     | S3 | S2 | S1 | S8 | S7 | S6 | S5 | S4 |
| T4  | D1  | D2  | D3  | D4  |     |     |     |     | S4 | S3 | S2 | S1 | S8 | S7 | S6 | S5 |
| T5  | D1  | D2  | D3  | D4  | D5  |     |     |     | S5 | S4 | S3 | S2 | S1 | S8 | S7 | S6 |
| T6  | D1  | D2  | D3  | D4  | D5  | D6  |     |     | S6 | S5 | S4 | S3 | S2 | S1 | S8 | S7 |
| T7  | D1  | D2  | D3  | D4  | D5  | D6  | D7  |     | S7 | S6 | S5 | S4 | S3 | S2 | S1 | S8 |
| T8  | D1  | D2  | D3  | D4  | D5  | D6  | D7  | D8  | S8 | S7 | S6 | S5 | S4 | S3 | S2 | S1 |
| T9  | D9  | D2  | D3  | D4  | D5  | D6  | D7  | D8  | S1 | S8 | S7 | S6 | S5 | S4 | S3 | S2 |
| T10 | D9  | D10 | D3  | D4  | D5  | D6  | D7  | D8  | S2 | S1 | S8 | S7 | S6 | S5 | S4 | S3 |
| T11 | D9  | D10 | D11 | D4  | D5  | D6  | D7  | D8  | S3 | S2 | S1 | S8 | S7 | S6 | S5 | S4 |
| T12 | D9  | D10 | D11 | D12 | D5  | D6  | D7  | D8  | S4 | S3 | S2 | S1 | S8 | S7 | S6 | S5 |
| T13 | D9  | D10 | D11 | D12 | D13 | D6  | D7  | D8  | S5 | S4 | S3 | S2 | S1 | S8 | S7 | S6 |
| T14 | D9  | D10 | D11 | D12 | D13 | D14 | D7  | D8  | S6 | S5 | S4 | S3 | S2 | S1 | S8 | S7 |
| T15 | D9  | D10 | D11 | D12 | D13 | D14 | D15 | D8  | S7 | S6 | S5 | S4 | S3 | S2 | S1 | S8 |
| T16 | D9  | D10 | D11 | D12 | D13 | D14 | D15 | D16 | S8 | S7 | S6 | S5 | S4 | S3 | S2 | S1 |
| T17 | D17 | D10 | D11 | D12 | D13 | D14 | D15 | D16 | S1 | S8 | S7 | S6 | S5 | S4 | S3 | S2 |

US 6,775,684 B1

DIGITAL MATCHED FILTER

BACKGROUND OF THE INVENTION

1. Field of the Invention

The present invention relates to a digital matched filter for use in a receiver or the like for spread-spectrum communication.

2. Description of the Prior Art

A method of data communication called spread-spectrum communication is known in which a transmitter transmits data signals after multiplying them by wide-band diffusion codes and a receiver restores the received signals to their original form, narrow-band signals, through back-diffusion. This method permits detection of data signals even when the carrier-to-noise ratio of received radio-wave signals is poor, and is thus regarded as a promising data communication method in code division multiple access, which is one form of multiple access for a mobile communication system.

In spread-spectrum communication, to restore received diffused data to its original form through back-diffusion, it is essential to synchronize the received data with the back-diffusion codes. As an index with which to achieve this synchronization, the correlation value between the received data and the back-diffusion codes is used. Here, the correlation value refers to the sum, at a given phase, of the products of the individual signals constituting the received data and the corresponding back-diffusion codes. This correlation value, at a phase at which the received data is synchronized with the back-diffusion codes, takes the maximum value among the correlation values at different phases. Accordingly, by detecting the phase at which the correlation value takes the maximum value, it is possible to synchronize the received data with the back-diffusion codes. One known method of calculating the correlation value at a given phase is to use a matched filter.

Figure 7:
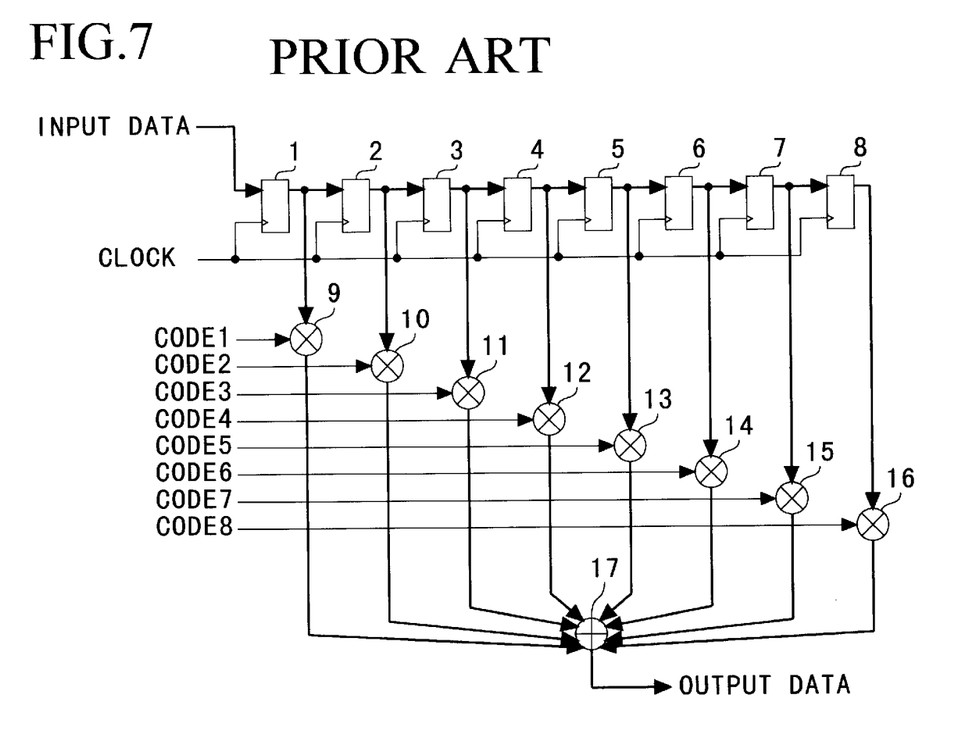
FIG. 7 is a block diagram of a conventional digital matched filter.

FIG. 7 shows an example of the configuration of a conventional digital matched filter. In this figure, reference numerals 1 to 8 represent delay devices, each outputting the data input thereto with a delay, that are connected in series in such a way that the data input to one delay device is shifted to the next in synchronism with the rising edges of a clock. Reference numerals 9 to 16 represent multipliers, each multiplying the output from corresponding one of the delay devices 1 to 8 by corresponding one of codes 1 to 8. Here, the codes 1 to 8 each take a value of either "1" or "0", and the multipliers 9 to 16 are each so configured as to multiply the output from the corresponding delay device by 1 or –1 according to whether the corresponding code equals "0" or "1", respectively. Reference numeral 17 represents an adder, which adds together the outputs from all the multipliers 9 to 16 and then outputs the result as output data.

Figure 8:
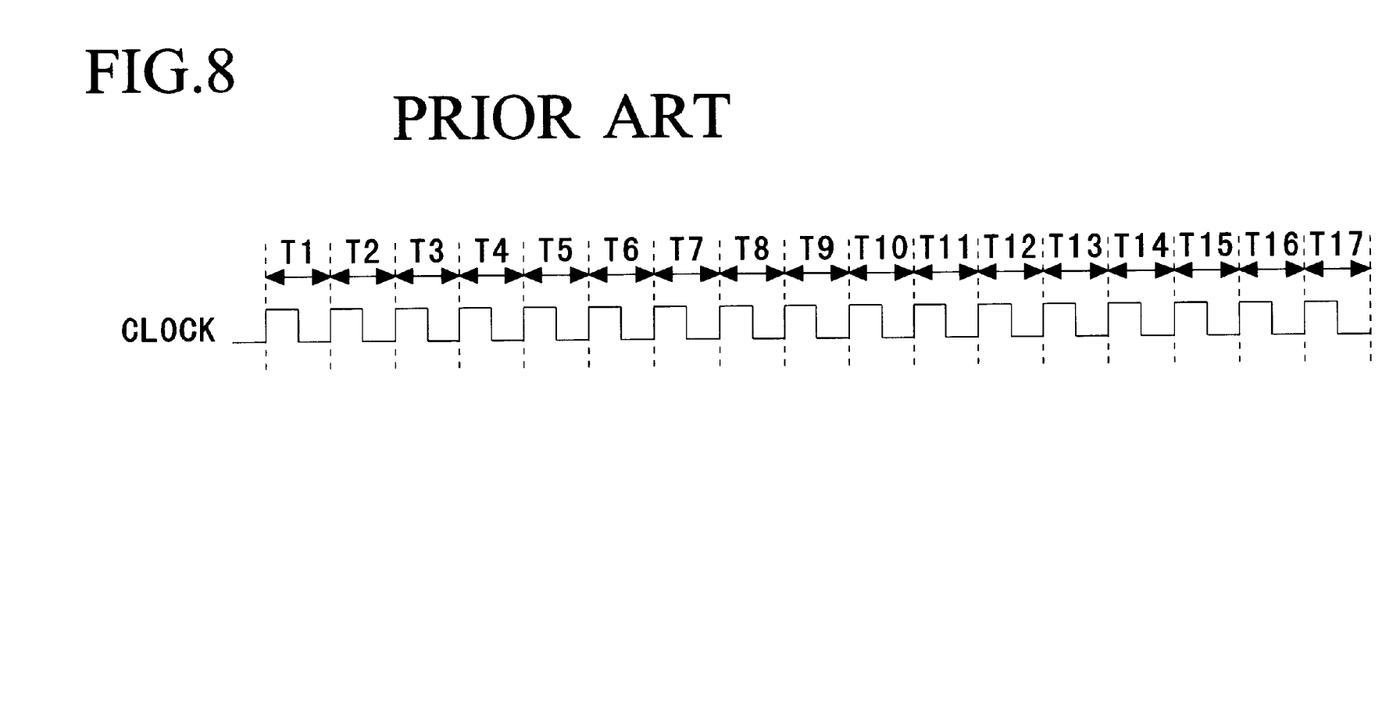
FIG. 8 is a diagram showing the clock used in the conventional digital matched filter shown in FIG. 7.
Figure 9:
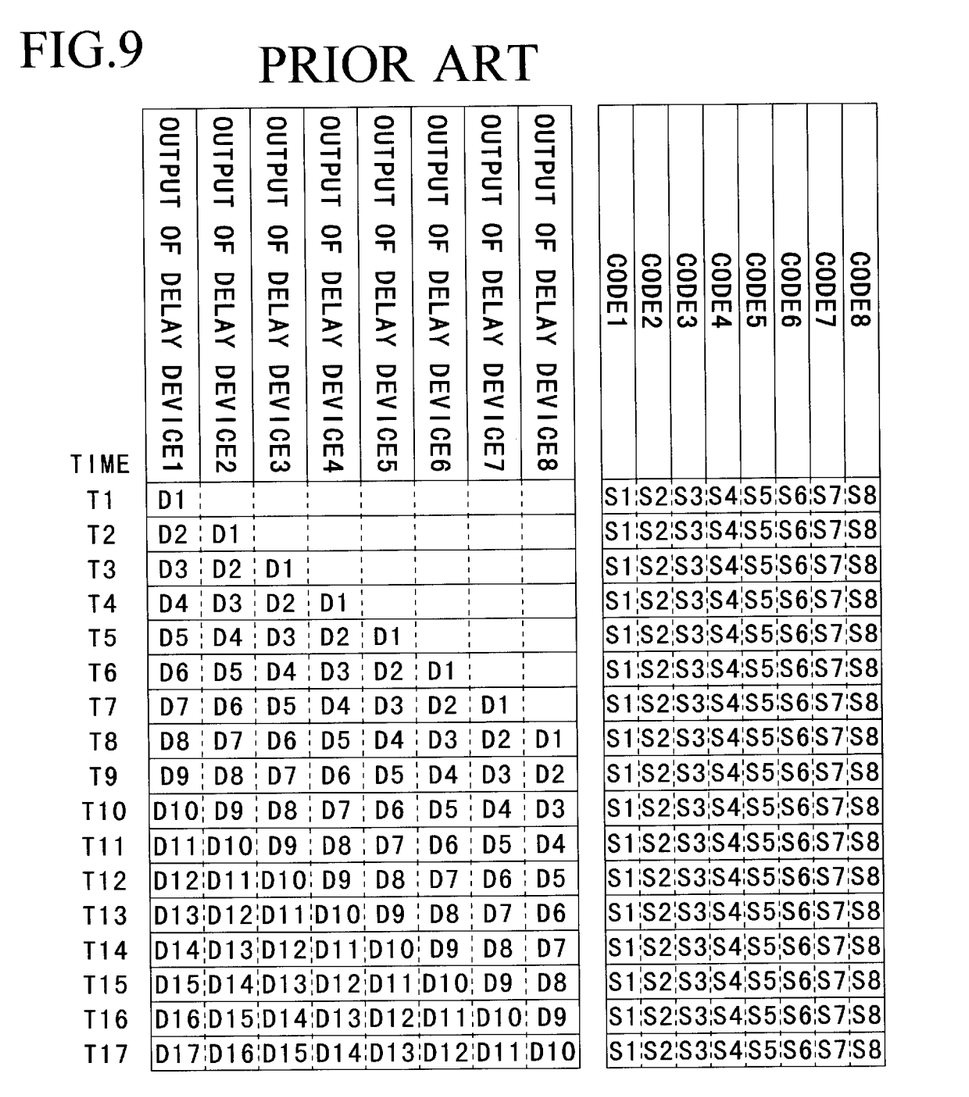
FIG. 9 is a diagram showing the operation of the conventional digital matched filter shown in FIG. 7.

Suppose that, as shown in FIG. 8, a lapse of time is divided into time intervals T1, T2, T3, . . . in a way that correspond to the rising edges of the clock. Then, the contents of the delay devices 1 to 8 and of the codes 1 to 8 in each of those time intervals are as shown in FIG. 9. Where input data D1, D2, D3, . . . is shifted from one of the delay devices 1 to 8 to the next, back-diffusion codes S1 to S8 remain still in the codes 1 to 8, respectively. Meanwhile, the correlation value between the input data and the back-diffusion codes is calculated in the following manner. Suppose that input data (Da, Db, Dc, Dd, De, Df, Dg, Dh) has been received in this order chronologically and, as a result, the delay devices 1 to 8 now output data Dh, Dg, Df, De, Dd, Dc, Db, and Da to the multipliers 9 to 16, respectively. Then, the adder 17 outputs, as output data, Dh×S1+Dg×S2+Df×S3+De×S4+Dd×S5+Dc×S6+Db×S7+Da×S8.

However, in this configuration, input data is shifted in all of the delay devices 1 to 8 at every rising edge of the clock, and thus the amount of change in signals per unit time interval is considerably great, which means that a large amount of electric power is consumed. Although FIG. 7 shows an example in which only eight delay devices are used, in practical applications it is necessary to use hundreds of delay devices, and therefore a huge amount of electric power is consumed.

Figure 10:
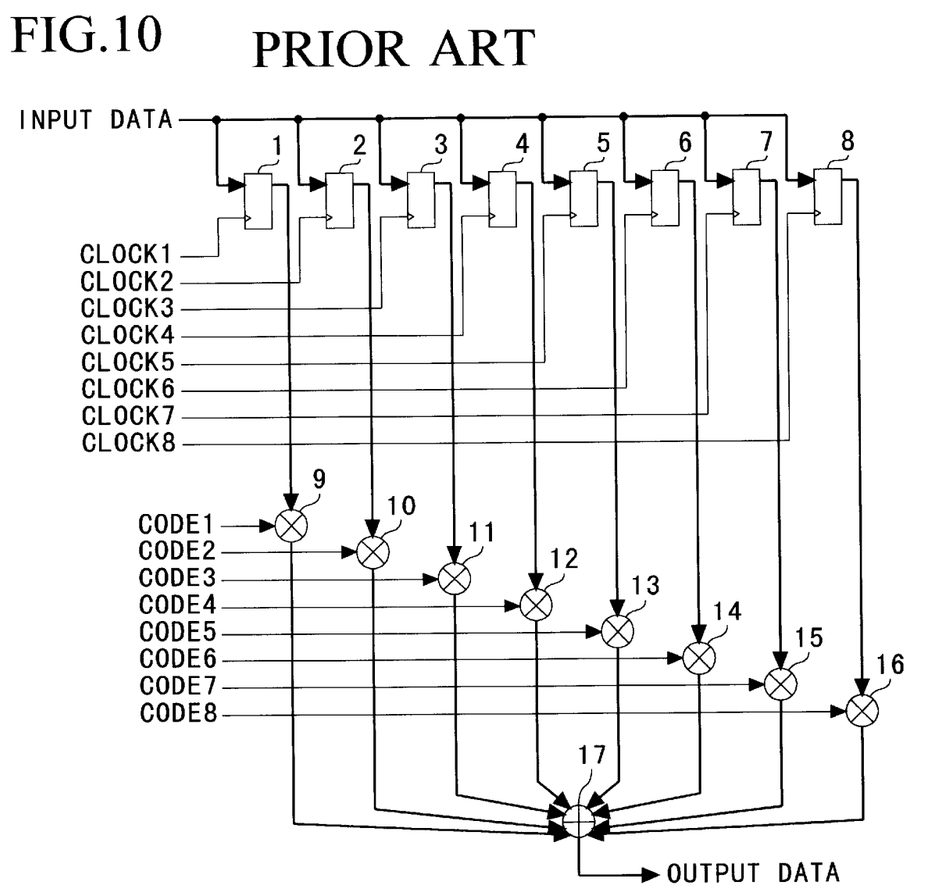
FIG. 10 is a block diagram of another conventional digital matched filter.

To solve this problem, Japanese Patent Application Laid-Open No. H10-173485 proposes a method that does not require the shifting of input data. An example of the configuration of a digital matched filter exploiting this method is shown in FIG. 10. In this figure, reference numerals 1 to 8 represent delay devices, each holding the data input thereto, that are connected in parallel in such a way as to hold the data fed thereto in synchronism with the rising edges of clocks 1 to 8, respectively.

Reference numerals 9 to 16 represent multipliers, each multiplying the output from corresponding one of the delay devices 1 to 8 by corresponding one of codes 1 to 8. Here, the codes 1 to 8 each take a value of either "1" or "0", and the multipliers 9 to 16 are each so configured as to multiply the output from the corresponding delay device by 1 or –1 according to whether the corresponding code equals "0" or "1", respectively. Reference numeral 17 represents an adder, which adds together the outputs from all the multipliers 9 to 16 and then outputs the result as output data.

Figure 11:
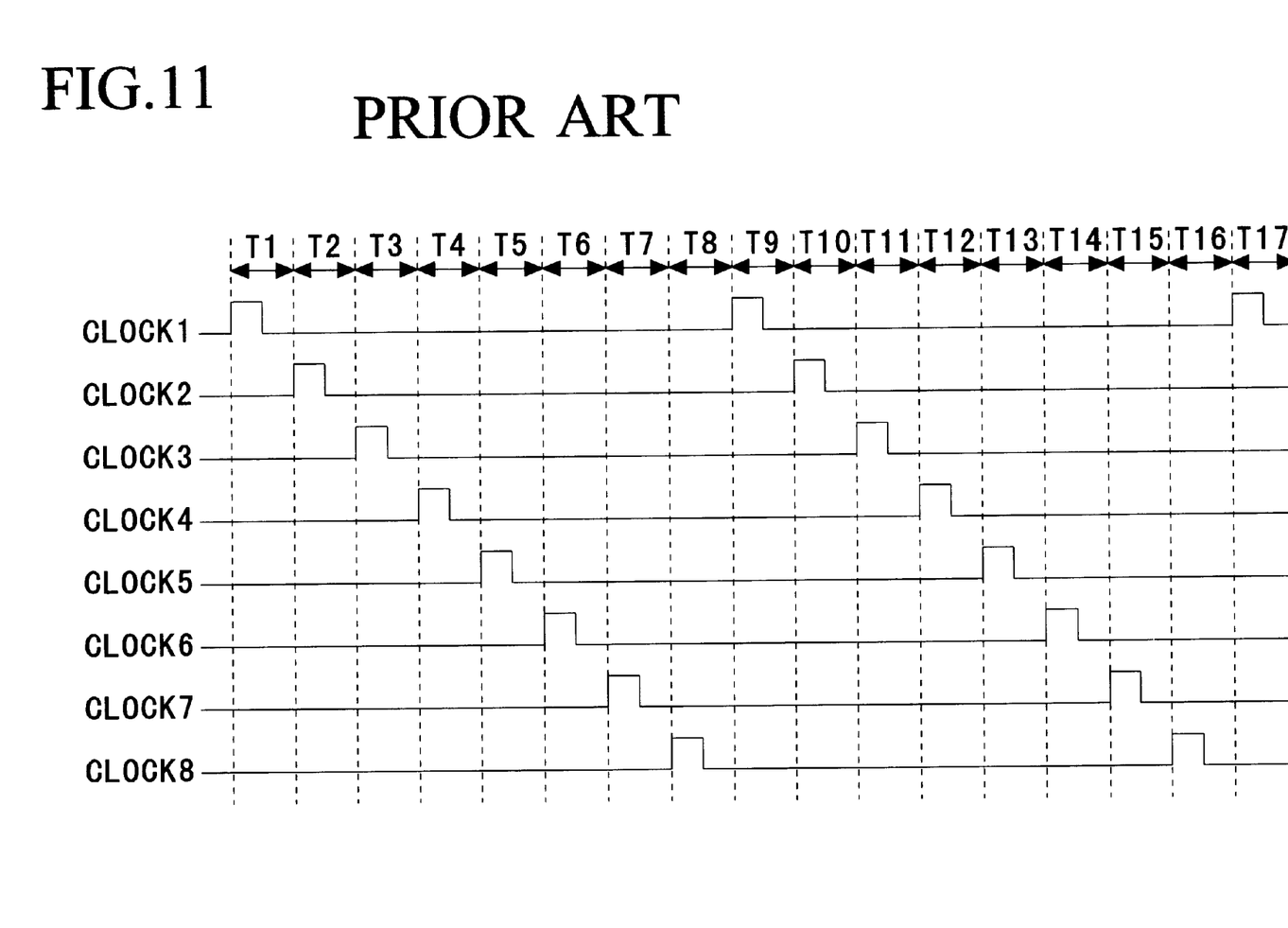
FIG. 11 is a diagram showing the clocks used in the conventional digital matched filter shown in FIG. 10.
Figure 12:
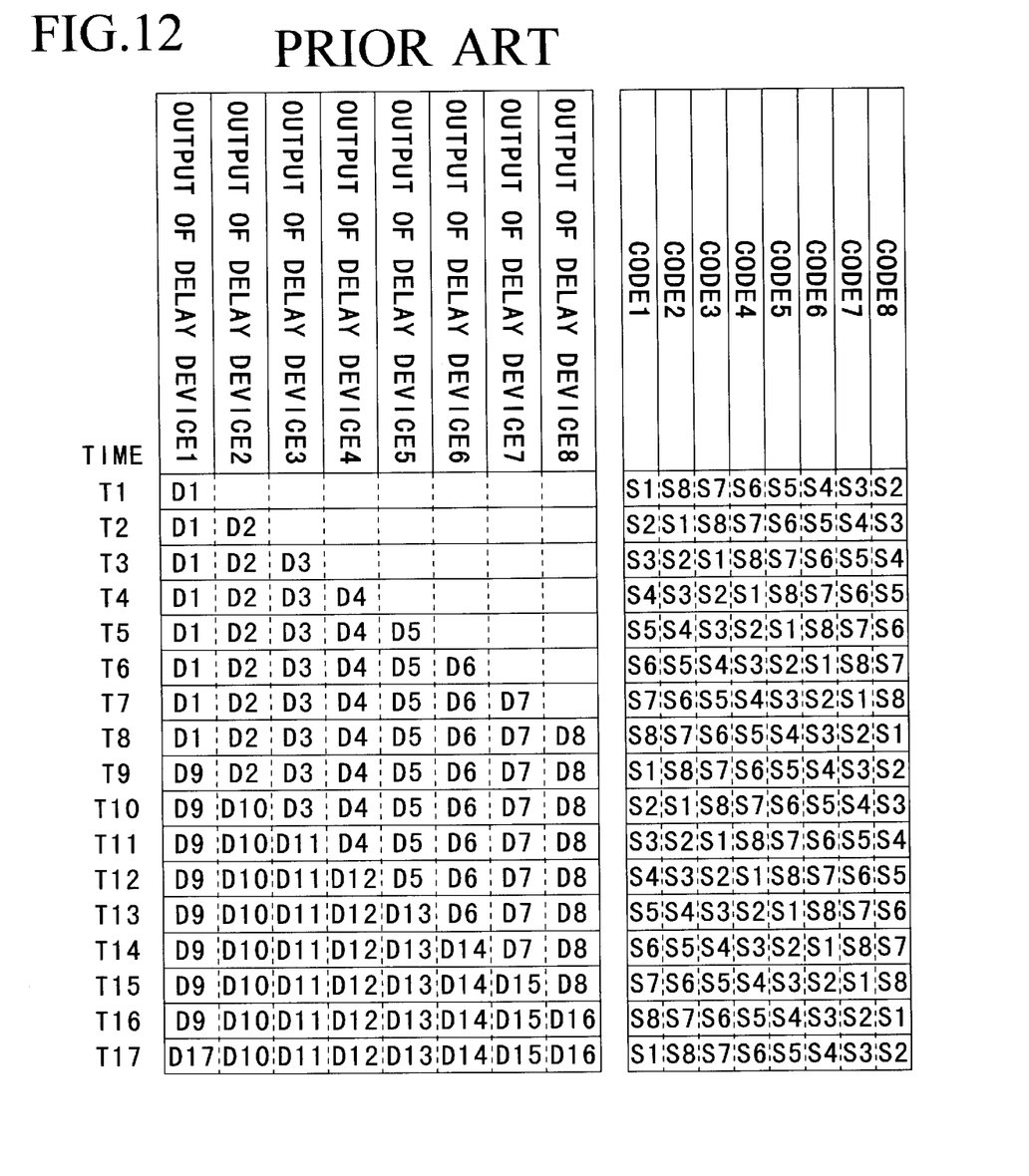
FIG. 12 is a diagram showing the operation of the conventional digital matched filter shown in FIG. 10.

As shown in FIG. 11, the clocks 1 to 8 are so produced that only one of them has a pulse in a given time interval, and thus each of the clocks 1 to 8 has one-eighth of the frequency of the clock shown in FIG. 8. Here, the contents of the delay devices 1 to 8 and of the codes 1 to 8 in each of consecutive time intervals are as shown in FIG. 12. Whereas input data D1, D2, D3, . . . remains held in fixed ones of the delay devices 1 to 8, back-diffusion codes S1 to S8 are shifted from one of the codes 1 to 8 to the next. Meanwhile, the correlation value between the input data and the back-diffusion codes is calculated.

In this configuration, back-diffusion codes need to be shifted, but input data, by being held in fixed delay devices, does not need to be shifted. In general, back-diffusion codes consist of fewer bits than input data. Accordingly, this method, requiring the shifting of back-diffusion codes but not the shifting of input data, helps reduce the amount of change in signals per unit time interval and thereby reduce electric power consumption.

However, in this configuration, to specify in which delay devices to hold input data, it is necessary to use as many clocks as the number of back-diffusion codes used; that is, in practical applications, it is necessary to use hundreds of clocks. This requires not only a large-scale clock generator circuit, but also a large area for conductor patterns for clocks. Moreover, input data needs to be fed to all delay devices simultaneously, and therefore the line for feeding input data needs to have a high load capacity, which leads to increased electric power consumption.

SUMMARY OF THE INVENTION

An object of the present invention is to provide a digital matched filter that makes it possible to reduce the amount of change in signals per unit time interval, reduce the number of clocks needed, and minimize the increase in the load capacity of a data input line.

To achieve the above object, according to the present invention, a digital matched filter is provided with: a serial-to-parallel conversion circuit for converting serial data fed thereto into n sets of parallel data (where n is a natural number); m-stage delay circuits (where m is a natural number), connected in series and provided as stages following the serial-to-parallel conversion circuit, each outputting the n sets of parallel data fed thereto with a delay corresponding to n sets of data; and a correlation value calculation circuit for calculating the correlation value between n×(m+1) sets of data output individually from the serial-to-parallel conversion circuit and from the m-stage delay circuits and n×(m+1) bit back-diffusion codes.

Here, the serial-to-parallel conversion circuit and the plurality of delay circuits process input data, fed in in serial form, after converting it into n sets of parallel data. This makes it possible to perform the shifting of the input data with fewer clocks than the number of back-diffusion codes and with clocks having lower frequencies than the frequency at which the input data changes, and also to minimize the increase in the load capacity of a data input line.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
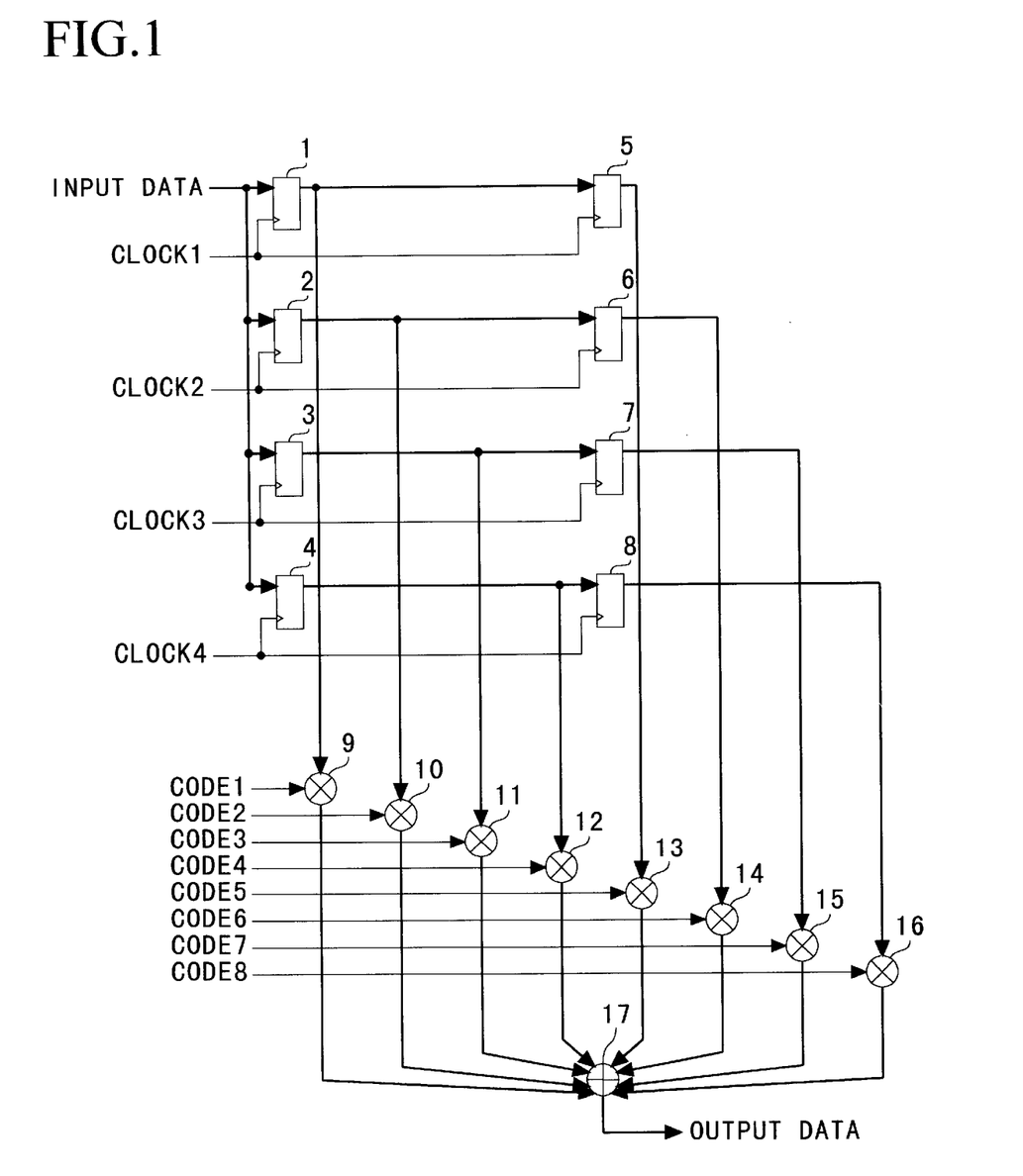
FIG. 1 is a block diagram of the digital matched filter of a first embodiment of the invention.

Hereinafter, embodiments of the present invention will be described with reference to the accompanying drawings. FIG. 1 is a block diagram of the digital matched filter of a first embodiment of the invention. In this figure, reference numerals 1 to 8 represent delay devices, which each hold the data input thereto. Of these delay devices 1 to 8, the delay devices 1 to 4 constitute a serial-to-parallel conversion circuit, and the delay devices 5 to 8 constitute a delay circuit. The delay devices 1 to 8 are so connected that each of the groups of the delay devices 1 and 5, 2 and 6, 3 and 7, and 4 and 8 forms a row of serially connected delay devices so that the data fed to each row of delay devices is shifted within that row in synchronism with the rising edges of corresponding one of clocks 1 to 4 that is fed to that row.

Reference numerals 9 to 16 represent multipliers, which multiply the outputs from the delay devices 1 to 8 by codes 1 to 8, respectively. Here, the codes 1 to 8 each take a value of either "1" or "0", and the multipliers 9 to 16 are each so configured as to multiply the output from the corresponding delay device by 1 or −1 according to whether the corresponding code equals "0" or "1", respectively. Reference numeral 17 represents an adder, which adds together the outputs from all the multipliers 9 to 16 and then outputs the result as output data.

Figure 2:
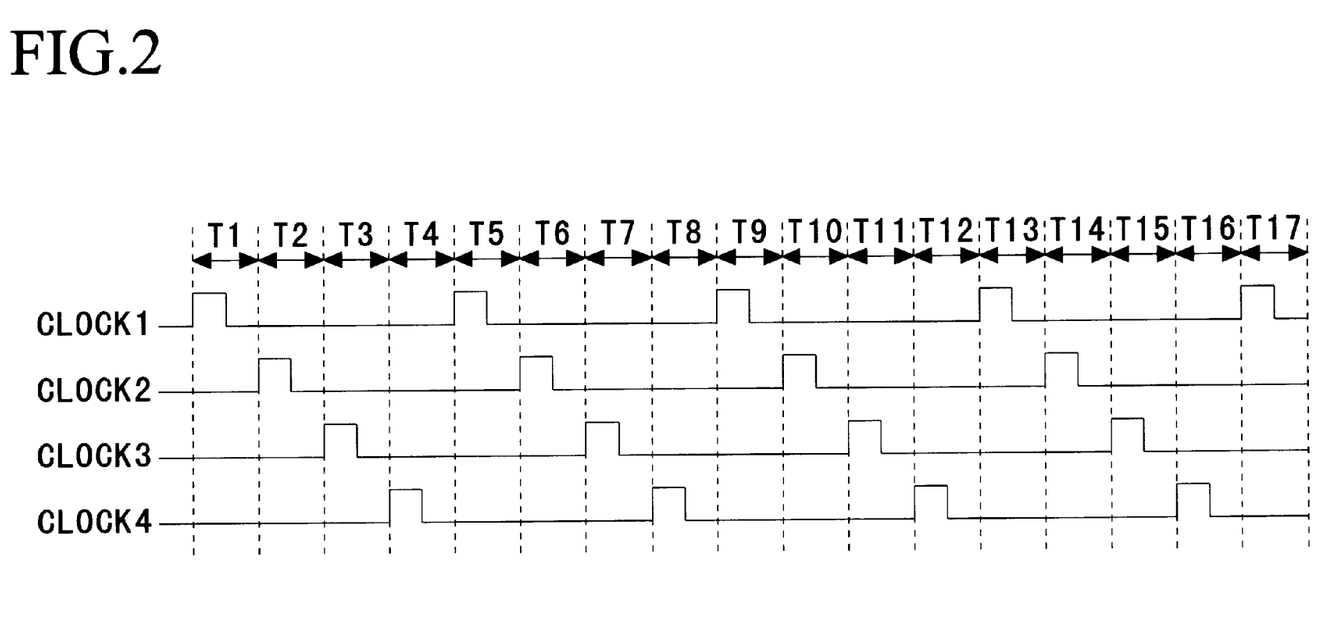
FIG. 2 is a diagram showing the clocks used in the digital matched filter of the first embodiment.
Figure 3:
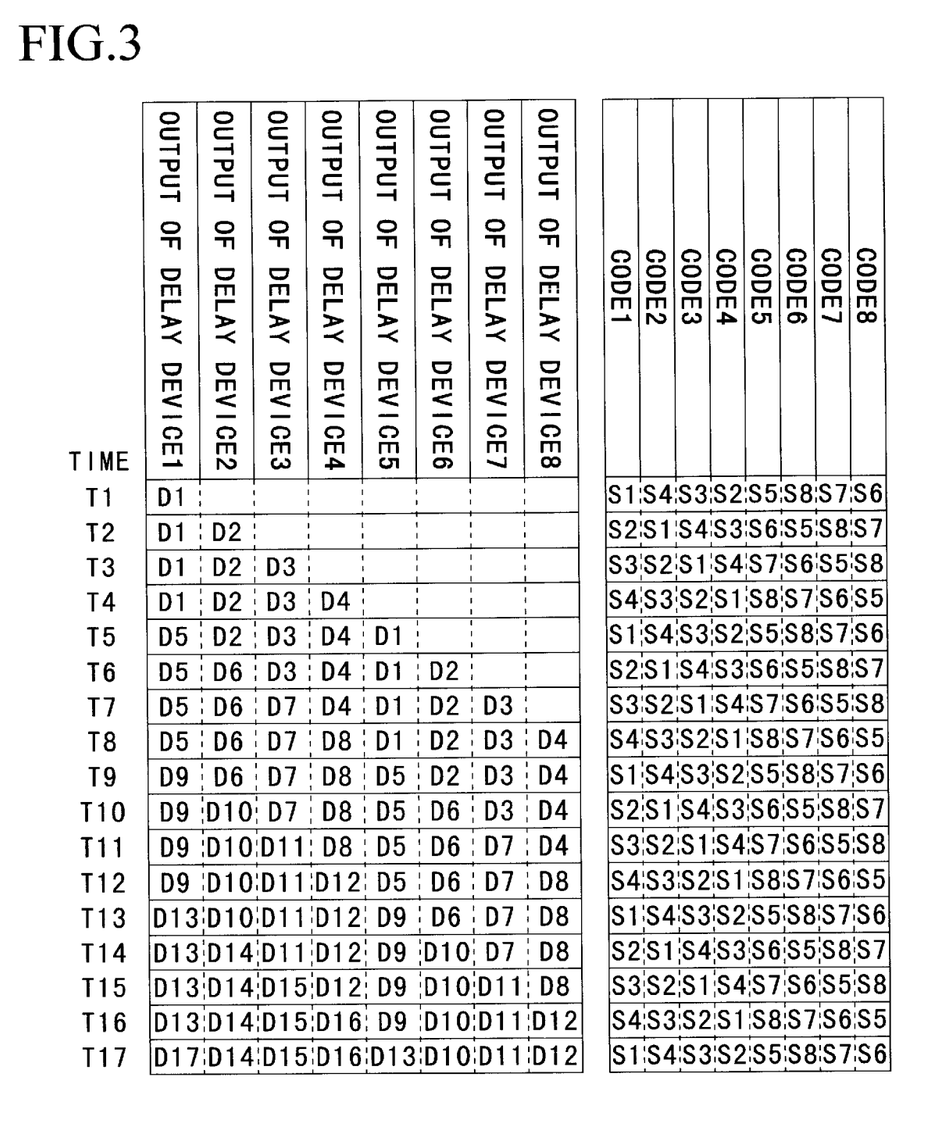
FIG. 3 is a diagram showing the operation of the digital matched filter of the first embodiment.

As shown in FIG. 2, the clocks 1 to 4 are so produced that only one of them has a pulse in a given time interval, and thus each of the clocks 1 to 4 has one-fourth of the frequency of the clock shown in FIG. 8. That is, in the clocks 1, 2, 3, and 4, pulses appear in one clock after another in the order named, i.e. in a cyclic manner. Here, the contents of the delay devices 1 to 8 and of the codes 1 to 8 in each of consecutive time intervals are as shown in FIG. 3.

Accordingly, the shifting of input data is performed as follows. To the delay devices 1 and 5, the sets D1, D5, D9, . . . of the input data are sequentially shifted every time a pulse appears in the clock 1. To the delay devices 2 and 6, the sets D2, D6, D10, . . . of the input data are sequentially shifted every time a pulse appears in the clock 2. To the delay devices 3 and 7, the sets D3, D7, D11, . . . of the input data are sequentially shifted every time a pulse appears in the clock 3. To the delay devices 4 and 8, the sets D4, D8, D12, . . . of the input data are sequentially shifted every time a pulse appears in the clock 4.

On the other hand, in the codes 1 to 4, back-diffusion codes S1 to S4 are sequentially shifted in a cyclic manner, and in the codes 5 to 8, back-diffusion codes S5 to S8 are sequentially shifted in a cyclic manner.

Then, the multipliers 9 to 16 multiply the input data described above by these back-diffusion codes on a one-set-of-data-by-one-bit-code basis, and the adder 17 adds together all the results of those individual multiplications. In this way, the correlation value is calculated.

Specifically, input data (Da, Db, Dc, Dd, De, Df, Dg, Dh) received in this order chronologically is first converted by the serial-to-parallel conversion circuit into two suits of four sets of parallel data (Da, Db, Dc, Dd) and (De, Df, Dg, Dh). Of these two suits of four sets of parallel data, the one received and converted earlier (Da, Db, Dc, Dd) is fed to the delay circuit so as to be latched.

Then, the other suit of four sets of parallel data (De, Df, Dg, Dh) that is output from the serial-to-parallel conversion circuit next is multiplied by the codes 1 to 4 by the multipliers 9 to 12, and simultaneously the parallel data (Da, Db, Dc, Dd) output from the delay circuit is multiplied by the codes 5 to 8 by the multipliers 13 to 16. Thus, by being multiplied by the multipliers 9 to 16, the input data is multiplied by the totally eight-bit back-diffusion codes, on a one-set-of data-by-one-bit-code basis. The results of those individual multiplications performed by the multipliers 9 to 16 are then added together by the adder 17, and in this way, just as in the conventional examples described earlier, the correlation value between the input data and the back-diffusion codes, i.e. Dh×S1+Dg×S2+Df×S3+De×S4+Dd×S5+Dc×S6+Db×S7+Da×S8, is obtained as output data.

In this configuration, the provision of the serial-to-parallel conversion circuit that converts input data, which is serial data, into two suits of four sets of parallel data and the provision of the delay circuit that delays one of those two suits of four sets of parallel data make it possible to achieve the shifting of input data with four clocks, i.e. with a smaller number of clocks than the number of back-diffusion codes, of which there are eight.

Moreover, the four clocks each have one-forth of the frequency at which the input data changes. This helps reduce the amount of change in signals per unit time interval and thereby reduce electric power consumption.

Moreover, input data needs to be fed to only four delay devices. This helps minimize the load capacity of the data input line.

Moreover, the four clocks that are fed to each delay circuit are clocks having identical frequencies and different phases. This permits back-diffusion codes to be shifted simply in a cyclic manner in groups of four, and thus ensures easy control of back-diffusion codes even with a larger number of back-diffusion codes.

Although input data is converted by the serial-to-parallel conversion circuit into four sets of parallel data in this embodiment, it may be converted into n sets of parallel data, i.e. parallel data consisting of any number of concurrent sets of data. In this case, the serial-to-parallel conversion circuit and the delay circuit each have n delay devices provided therein. Moreover, to achieve the shifting of data in groups of n sets of data by simultaneously operating the delay devices connected in series between the serial-to-parallel conversion circuit and the delay circuit, the serial-to-parallel conversion circuit and the delay circuit are fed with n clocks having different phases.

Moreover, by connecting m stages of delay circuits in series, it is possible, assuming that input data is converted into n sets of parallel data, to calculate the correlation value between the input data and n×(m+1) bits of back-diffusion codes. In this case, the delay devices provided in the serial-to-parallel conversion circuit and in the individual delay circuits are, as a whole, so connected that each of groups of m+1 delay devices forms a row of serially connected delay devices. Moreover, to achieve the shifting of data in groups of n sets of data by simultaneously operating those delay devices connected in series in groups of m+1, the serial-to-parallel conversion circuit and the delay circuits are fed with n clocks having different phases. In this way, providing a plurality of stages of delay circuits helps reduce the number of clocks having different phases needed.

When the correlation value between input data and n×(m+1) bits of back-diffusion codes is calculated in this way, the correlation value can be calculated by feeding the back-diffusion codes to the multipliers while shifting the back-diffusion codes in a cyclic manner in groups of four every time the digital matched filter receives one set of the input data. That is, assuming that the multipliers are grouped into groups each composed of n multipliers that together constitute a multiplication circuit in such a way that those groups correspond one to one to the serial-to-parallel conversion circuit and the individual delay circuits, as the digital matched filter receives one set of the input data after another, the back-diffusion codes fed in groups of n to the m+1 multiplication circuits are shifted one bit after another. In this embodiment, the multipliers 9 to 12 constitute one multiplication circuit, and the multipliers 13 to 16 constitute another multiplication circuit.

Figure 4:
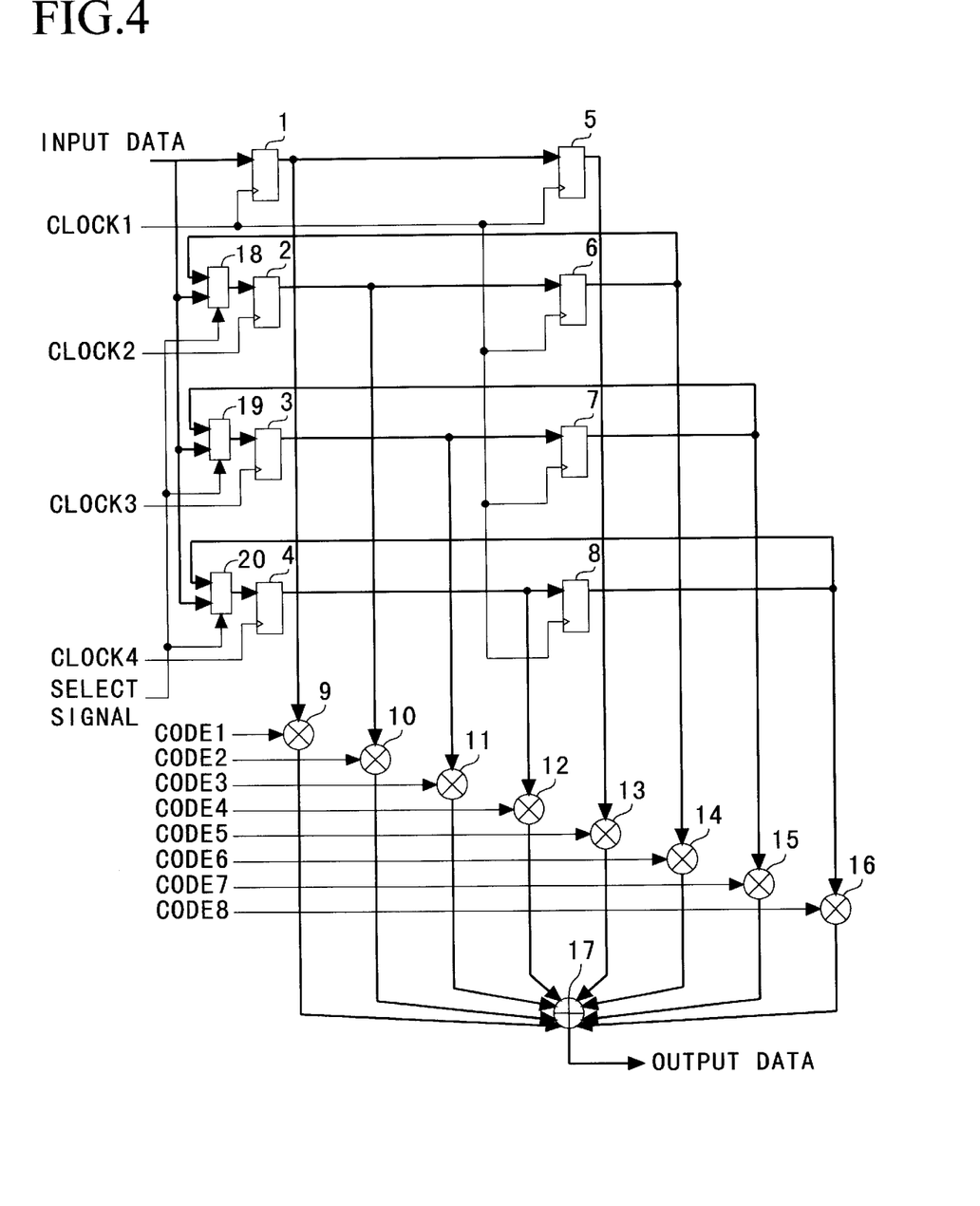
FIG. 4 is a block diagram of the digital matched filter of a second embodiment of the invention.

FIG. 4 is a block diagram of the digital matched filter of a second embodiment of the invention. In this figure, reference numerals 1 to 8 represent delay devices, which each hold the data fed thereto. Of the delay devices 1 to 8, the delay devices 1 to 4 constitute a serial-to-parallel conversion circuit, and the delay devices 5 to 8 constitute a delay circuit. The delay devices 1 to 8 are so connected that each of the groups of the delay devices 1 and 5, 2 and 6, 3 and 7, and 4 and 8 forms a row of serially connected delay devices, and that, whereas the delay devices 5, 6, 7, and 8 provided in the delay circuit and the delay device 1 of the serial-to-parallel conversion circuit shift the data fed thereto in synchronism with the rising edges of a clock 1, the other delay devices 2, 3, and 4 of the serial-to-parallel conversion circuit shift the data fed thereto in synchronism with the rising edges of clocks 2, 3, and 4, respectively.

The delay devices 2, 3, and 4 are provided with select circuits 18, 19, and 20, respectively, so that they receive the outputs of the delay devices 6, 7, and 8, respectively, when a select signal equals "1" and receive input data when the select signal equals "0". Reference numerals 9 to 16 represent multipliers, which multiply the outputs of the delay devices 1 to 8 by codes 1 to 8, respectively. Here, the codes 1 to 8 each take a value of either "1" or "0", and the multipliers 9 to 16 are each so configured as to multiply the output from the corresponding delay device by 1 or −1 according to whether the corresponding code equals "0" or "1", respectively. Reference numeral 17 represents an adder, which adds together the outputs from all the multipliers 9 to 16 and then outputs the result as output data.

Figure 5:
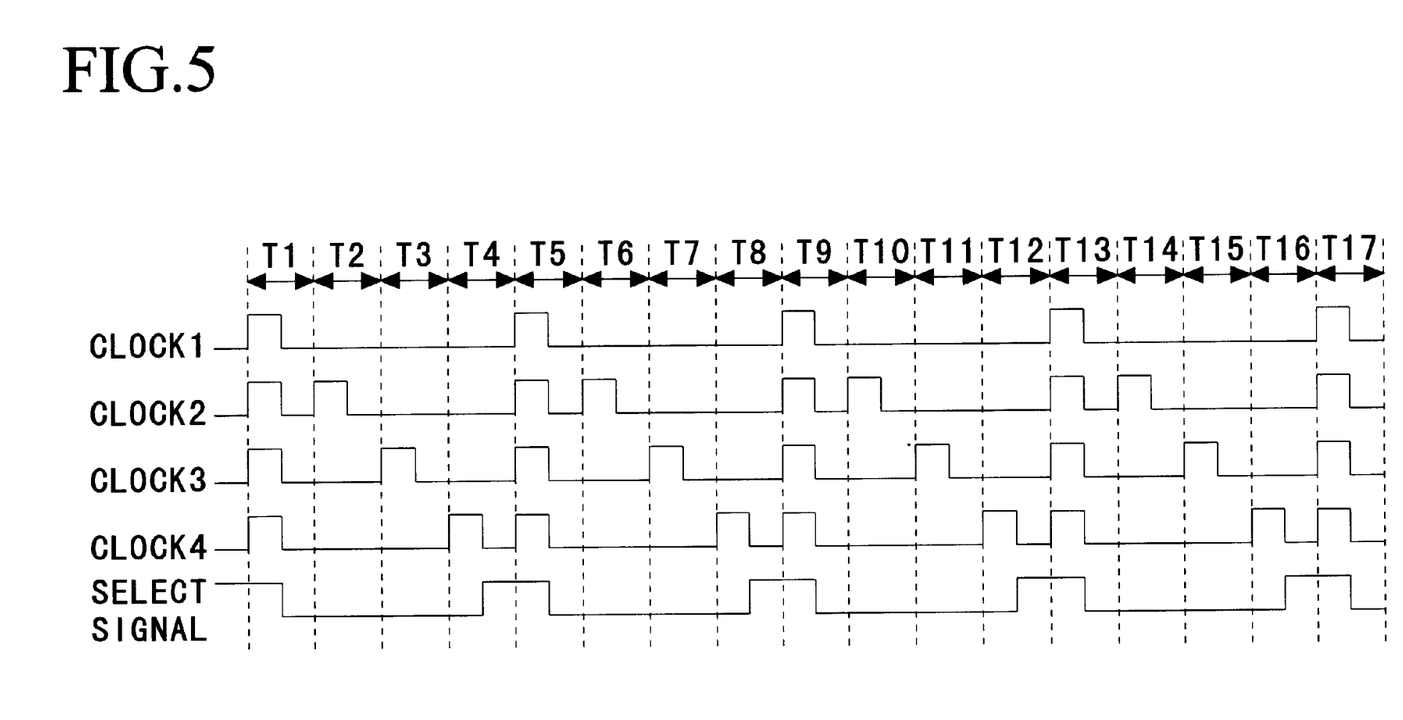
FIG. 5 is a diagram showing the clocks used in the digital matched filter of the second embodiment.

The clocks 1 to 4 are produced as shown in FIG. 5. The select signal is so produced that it equals "1" for periods from slightly before each rising edge of the clock 1 to slightly after it and remains "0" otherwise. As in the first embodiment, the clock 1 has one-fourth of the frequency of the clock shown in FIG. 8. The clocks 2 to 4 are each so produced that two pulses appear therein within the period within which a single pulse appears in the clock 1. Of these two pulses that the clocks 2 to 4 each produce within this period, one is produced with identical timing with the pulse appearing in the clock 1, and the other is produced with different timing among the clocks 2 to 4. Specifically, for example in time intervals T1 to T5 shown in the figure, pulses appear in all of the clocks 1 to 4 in the time interval T1, and then pulses appear sequentially in the clocks 2 to 4 in the order named in the time intervals T2, T3, and T4, respectively. On the other hand, the select signal turns from "1" to "0" during the time interval T1, and turns from "0" to "1" during the time interval T4.

Figure 6:
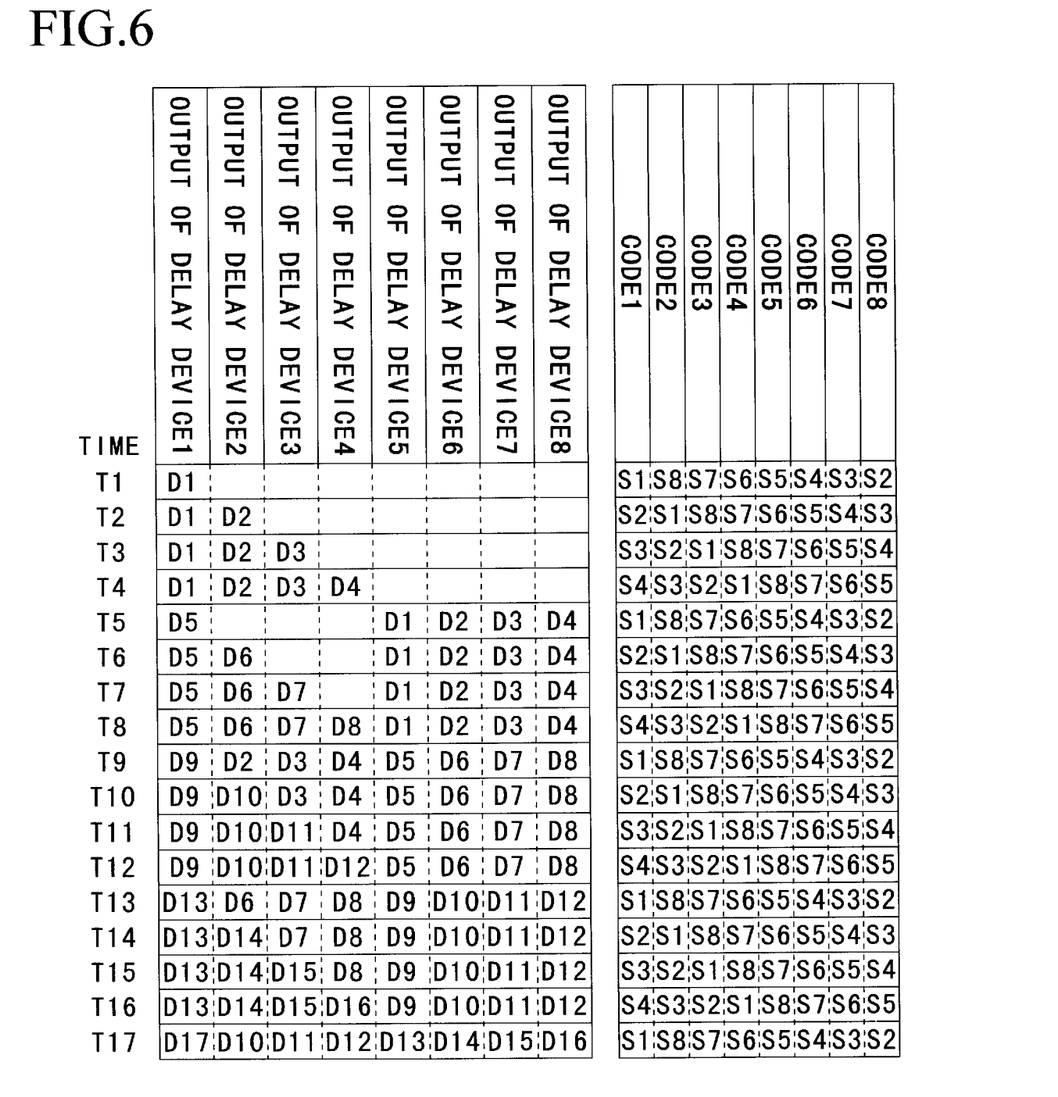
FIG. 6 is a diagram showing the operation of the digital matched filter of the second embodiment.

As a result of the clocks 1 to 4 and the select signal changing as described above, the contents of the delay devices 1 to 8 and of the codes 1 to 8 in each of consecutive time intervals are as shown in FIG. 6. To the delay devices 1 and 5, the sets D1, D5, D9, . . . of the input data are sequentially shifted every time a pulse appears in the clock 1. To the delay devices 6, 7, and 8, the sets D2, D6, D10, . . . , the sets D3, D7, D11, . . . , and the sets D4, D8, D12, . . . , respectively, of the input data are sequentially shifted every time a pulse appears in the clock 1.

As for the delay device 2, when one of the pulses appearing in the clock 2 that appears with identical timing with the pulse appearing in the clock 1 appears, the data latched in the delay device 6 is selected by the select circuit 18 and is shifted to the delay device 2; then, when the other of the pulses appearing in the clock 2 appears, the sets D2, D6, D10, . . . of the input data are shifted through the select circuit 18 to the delay device 2. Thus, to the delay device 2, the sets of the input data are shifted in the order D2, D6, D2, D10, D6, D14 . . . .

As for the delay device 3, when one of the pulses appearing in the clock 3 that appears with identical timing with the pulse appearing in the clock 1 appears, the data latched in the delay device 7 is selected by the select circuit 19 and is shifted to the delay device 3; then, when the other of the pulses appearing in the clock 3 appears, the sets D3, D7, D11, . . . of the input data are shifted through the select circuit 19 to the delay device 3. Thus, to the delay device 3, the sets of the input data are shifted in the order D3, D7, D3, D11, D7, D15 . . . .

As for the delay device 4, when one of the pulses appearing in the clock 4 that appears with identical timing with the pulse appearing in the clock 1 appears, the data latched in the delay device 8 is selected by the select circuit 20 and is shifted to the delay device 3; then, when the other of the pulses appearing in the clock 4 appears, the sets D4, D8, D12, . . . of the input data are shifted through the select circuit 20 to the delay device 4. Thus, to the delay device 4, the sets of the input data are shifted in the order D4, D8, D4, D12, D8, D16 . . . .

On the other hand, in the codes 1 to 8, back-diffusion codes S1 to S8 are so shifted that they are shifted forward three times and then backward once. Meanwhile, the correlation value between the input data and the back-diffusion codes is calculated.

How the back-diffusion codes are shifted forward three times and then backward once will be described more specifically below. First, in the time interval T1, the codes 1 to 8 have S1, S8, S7, S6, S5, S4, S3, and S2. Then, in the time interval T2, the back-diffusion codes are shifted forward once so that the codes 1 to 8 have S2, S1, S8, S7, S6, S5, S4, and S3. Then, in the time interval T3, the back-diffusion codes are shifted forward another time so that the codes 1 to 8 have S3, S2, S1, S8, S7, S6, S5, and S4. Then, in the time interval T4, the back-diffusion codes are shifted forward another time so that the codes 1 to 8 have S4, S3, S2, S1, S8, S7, S6, and S5. Then, in the time interval T5, the back-diffusion codes are shifted backward so that the codes 1 to 8 have S1, S8, S7, S6, S5, S4, S3, and S2 again as in the time interval T1. Thereafter, the back-diffusion codes are shifted forward three times and then backward once in the same manner repeatedly.

In this configuration, the provision of the serial-to-parallel conversion circuit that converts input data, which is serial data, into four sets of parallel data and the provision of the delay circuit that delays the parallel data in groups of four sets of data make it possible to achieve the shifting of input data with four clocks, i.e. with a smaller number of clocks than the number of back-diffusion codes, of which there are eight, plus one select signal.

Moreover, the clock 1 that is used to drive the delay devices other than the delay devices 2, 3, and 4 has one-forth of the frequency at which the input data changes. This helps reduce the amount of change in signals per unit time interval and thereby reduce electric power consumption.

Moreover, input data needs to be fed to only one delay device and three select circuits. This helps minimize the load capacity of the data input line.

Moreover, only one clock is needed to drive the delay devices other than the delay devices 2, 3, and 4. This helps simplify the conductor pattern for the clock.

Although input data is converted by the serial-to-parallel conversion circuit into four sets of parallel data in this embodiment, it may be converted into n sets of parallel data, i.e. parallel data consisting of any number of concurrent sets of data. In this case, the serial-to-parallel conversion circuit and the delay circuit each have n delay devices provided therein. Moreover, to one of the delay devices constituting the serial-to-parallel conversion circuit and to the individual delay devices constituting the delay circuit, a clock having an identical phase is fed and, to the other n−1 of the delay devices constituting the serial-to-parallel conversion circuit, n−1 clocks having different phases are fed individually. These n−1 delay devices are provided individually with select circuits that feed either input data or data output from the delay circuit thereto.

Moreover, by connecting m stages of delay circuits in series, it is possible, assuming that input data is converted into n sets of parallel data, to calculate the correlation value between the input data and n×(m+1) bits of back-diffusion codes. In this case, the delay devices provided in the serial-to-parallel conversion circuit and in the individual delay circuits are, as a whole, so connected that each of groups of m+1 delay devices forms a row of serially connected delay devices. Assume that each of those groups of m+1 serially connected delay devices is called a delay device group. Then, of the n delay device groups in total, n−1 delay device groups are provided individually with select circuits in a stage preceding thereto. These select circuits feed either input data or data output from the last-stage delay devices of the individual delay device groups to the delay devices provided in the serial-to-parallel conversion circuit.

In this way, when a plurality of stages of delay circuits are provided, to those of the delay devices provided in the serial-to-parallel conversion circuit which are not provided with select circuits and to the delay devices constituting the individual delay circuits, a clock of an identical phase is fed and, to the other n−1 delay devices provided in the serial-to-parallel conversion circuit, n−1 clocks having different phases are fed individually. Accordingly, by providing a plurality of stages of delay circuits, it is possible to reduce the number of clocks having different phases that need to be fed to the digital matched filter.

As described above, according to the present invention, a digital matched filter is provided with a plurality of delay circuits that divide and delay input data. As a result, it is possible to perform the shifting of the input data with a clock having a frequency lower than the frequency at which the input data changes. This helps reduce the amount of change in signals per unit time interval and thereby reduce electric power consumption, and also minimize the increase in the number of clocks even with a larger number of back-diffusion codes. Moreover, it is also possible to minimize the increase in the load capacity of a data input line.

Moreover, the use of clocks having identical frequencies and different phases makes the shifting of back-diffusion codes easy.

By feeding an identical clock to the delay devices provided in the delay circuit, it is possible to simplify the conductor pattern for the clock.

Moreover, feeding the output of a last-stage delay device to a first-stage delay device helps minimize the total number of delay devices required.

What is claimed is:

1. A digital matched filter comprising:
a serial-to-parallel conversion circuit for converting serial data fed thereto into n sets of parallel data (where n is a natural number);
m-stage delay circuits (where m is a natural number) connected in series and provided as stages following the serial-to-parallel conversion circuit, the delay circuits each outputting the n sets of parallel data fed thereto with a delay corresponding to n sets of data; and a correlation value calculation circuit for calculating a correlation value between n×(m+1) sets of data output individually from the serial-to-parallel conversion circuit and from the m-stage delay circuits and n×(m+1) bit back-diffusion codes, wherein the serial-to-parallel conversion circuit and the m-stage delay circuits are each fed with n clocks having different phases.

2. A digital matched filter as claimed in claim 1, wherein the correlation value calculation circuit comprises:
  n×(m+1) multipliers for multiplying on a one-set-of-data-by-one-bit-code basis the n×(m+1) sets of data obtained as m+1 suits of n sets of parallel data output individually from the serial-to-parallel conversion circuit and from the m-stage delay circuits by the back-diffusion codes; and
  an adder for adding together every set of n×(m+1) sets of data output individually from the multipliers.

3. A digital matched filter as claimed in claim 1, wherein the serial-to-parallel conversion circuit has n delay devices to which the serial data is fed, and wherein the m-stage delay circuits each has n delay devices to which the n sets of parallel data is fed, one set to one delay device, from the serial-to-parallel conversion circuit or another of the delay circuits, whichever is provided as an immediately preceding stage.

4. A digital matched filter as claimed in claim 3, wherein the delay devices provided in each of the m-stage delay circuits and the delay devices provided in the serial-to-parallel conversion circuit or another of the delay circuits, whichever is provided as an immediately preceding stage, are connected individually in series in one-to-one correspondence, and wherein the serial-to-parallel conversion circuit and the m-stage delay circuits are each fed with n clocks having different phases in such a way that each of n delay device groups each composed of m+1 delay devices that are connected in series with one another receives a clock having an identical phase.

5. A digital matched filter as claimed in claim 4, wherein the correlation value calculation circuit comprises:
  n×(m+1) multipliers for multiplying on a one-set-of-data-by-one-bit-code basis the n×(m+1) sets of data obtained as m+1 suits of n sets of parallel data output individually from the serial-to-parallel conversion circuit and from each of the m-stage delay circuits; and
  an adder for adding together every set of n×(m+1) sets of data output individually from the multipliers.

6. A digital matched filter as claimed in claim 5, wherein the back-diffusion codes fed to the multipliers are shifted cyclically by being shifted each time the serial data switches from one sequence to a next.

7. A digital matched filter as claimed in claim 6, wherein, when the back-diffusion codes fed to the multipliers are shifted n times, the multipliers receive the original back-diffusion codes.

8. A digital matched filter comprising:

a first delay device group having m-stage delay devices (where m is a natural number) connected in series with one another and receiving input data, in serial form, at the first-stage delay device thereof;

n−1 second delay device groups (where n is a natural number) each having m-stage delay devices connected in series with one another;

n−1 select circuits for feeding either data output from the last-stage delay devices of the individual second delay device groups or input data to the first-stage delay devices of the same second delay device groups individually; and a correlation value calculation circuit for calculating a correlation value between m×n sets of data output individually from the delay devices and m×n bit back-diffusion codes.

9. A digital matched filter as claimed in claim 8, wherein the correlation value calculation circuit comprises:
  m×n multipliers for multiplying on a one-set-of-data-by-one-bit-code basis the m×n sets of data output individually from the delay devices constituting the first and second delay device groups by the back-diffusion codes; and
  an adder for adding together every set of m×n sets of data output individually from the multipliers.

10. A digital matched filter as claimed in claim 9, wherein the back-diffusion codes fed to the multipliers are shifted cyclically by being shifted each time the serial data switches from one sequence to a next.

11. A digital matched filter as claimed in claim 10, wherein, when the back-diffusion codes fed to the multipliers are shifted n times, the multipliers receive the original back-diffusion codes.

12. A digital matched filter, comprising:

a first delay device group having m-stage delay devices (where m is a natural number) connected in series with one another and receiving input data, in serial form, at the first-stage delay device thereof;

n−1 second delay device groups (where n is a natural number) each having m-stage delay devices connected in series with one another;

n−1 select circuits for feeding either data output from the last-stage delay devices of the individual second delay device groups or input data to the first-stage delay devices of the same delay device groups individually; and a correlation value calculation circuit for calculating a correlation value between m×n sets of data output individually from the delay devices and m×n bit back-diffusion codes, wherein all of the delay devices provided in the first delay device group and the second-to-last-stage delay devices provided in the individual second delay device groups are fed with a clock having an identical phase, and wherein the first-stage delay devices of the individual second delay device groups are fed with clocks having different phases.

13. A digital matched filter as claimed in claim 12, wherein, when data is shifted simultaneously to all of the delay devices provided in the first delay device group and the second-to-last-stage delay devices provided in the individual second delay device groups, the select circuits select data latched in the last-stage delay devices provided in the individual second delay device groups and shifts that data to the first-stage delay devices provided in the individual second delay device groups.

14. A digital matched filter as claimed in claim 13, wherein the correlation value calculation circuit comprises:

m×n multipliers for multiplying on a one-set-of-data-by-one-bit-code basis the m×n sets of data output individually from the delay devices constituting the first and second delay device groups by the back-diffusion codes; and an adder for adding together every set of m×n sets of data output individually from the multipliers.

15. A digital matched filter as claimed in claim 14, wherein, when the serial data switches n times, the select circuits select the data output from the last-stage delay devices.

16. A digital matched filter as claimed in claim 15, wherein, when the back-diffusion codes fed to the multipliers are shifted n times, the multipliers receive the original back-diffusion codes.

17. A digital matched filter as claimed in claim 12, wherein the correlation value calculation circuit comprises:

m×n multipliers for multiplying on a one-set-of-data-by-one-bit-code basis the m×n sets of data output individually from the delay devices constituting the first and second delay device groups by the back-diffusion codes; and an adder for adding together every set of m×n sets of data output individually from the multipliers.

18. A digital matched filter, comprising:

a serial-to-parallel conversion circuit for converting serial data fed thereto into n sets of parallel data (where n is a natural number);

m-stage delay circuits (where m is a natural number) connected in series and provided as stages following the serial-to-parallel conversion circuit, the delay circuits each outputting the n sets of parallel data fed thereto with a delay corresponding to n sets of data; and a correlation value calculation circuit for calculating a correlation value between n×(m+1) sets of data output individually from the serial-to-parallel conversion circuit and from the m-stage delay circuits and n×(m+1) bit back-diffusion codes, the correlation value calculation circuit comprising:

n×(m+1) multipliers for multiplying on a one-set-of-data-by-one-bit-code basis the n×(m+1) sets of data obtained as m+1 suits of n sets of parallel data output individually from the serial-to-parallel conversion circuit and from the m-stage delay circuits by the back-diffusion codes; and an adder for adding together every set of n×(m+1) sets of data output individually from the multipliers, wherein the back-diffusion codes fed to the multipliers are shifted cyclically by being shifted each time the serial data switches from one sequence to a next.

19. A digital matched filter as claimed in claim 18, wherein, when the back-diffusion codes fed to the multipliers are shifted n times, the multipliers receive the original back-diffusion codes.

20. A digital matched filter, comprising:

a first delay device group having m-stage delay devices (where m is a natural number) connected in series with one another and receiving input data, in serial form, at the first-stage delay device thereof;

n−1 second delay device groups (where n is a natural number) each having m-stage delay devices connected in series with one another;

n−1 select circuits for feeding either data output from the last-stage delay devices of the individual second delay device groups or input data to the first-stage delay devices of the same second delay device groups individually; and a correlation value calculation circuit for calculating a correlation value between m×n sets of data output individually from the delay devices and m×n bit back-diffusion codes, wherein, when the serial data switches n times, the select circuits select the data output from the last-stage delay devices.

21. A digital matched filter as claimed in claim 20, wherein, when the select circuits select the data output from the last-stage delay devices, pulses are produced simultaneously in the clocks fed to the first-stage delay devices of the individual second delay device groups.

22. A digital matched filter as claim in claim 20, wherein the correlation value calculation circuit comprises:

m×n multipliers for multiplying on a one-set-of-data-by-one-bit-code basis the m×n sets of data output individually from the delay devices constituting the first and second delay device groups by the back-diffusion codes; and an adder for adding together every set of m×n sets of data output individually from the multipliers.

* * * * *